United States Patent
Choi et al.

(10) Patent No.: US 9,848,217 B2
(45) Date of Patent: Dec. 19, 2017

(54) METHOD FOR TRANSMITTING AND RECEIVING PROGRAM CONFIGURATION INFORMATION FOR SCALABLE ULTRA HIGH DEFINITION VIDEO SERVICE IN HYBRID TRANSMISSION ENVIRONMENT, AND METHOD AND APPARATUS FOR EFFECTIVELY TRANSMITTING SCALAR LAYER INFORMATION

(75) Inventors: Byeong Ho Choi, Yongin-si (KR); Je Woo Kim, Seongnam-si (KR); Hwa Seon Shin, Yongin-si (KR); Jae-Gon Kim, Goyang-si (KR); Doo San Baek, Goyang-si (KR); Dong Il Park, Seoul (KR)

(73) Assignee: Korea Electronics Technology Institute, Seongnam-si (KR)

( * ) Notice: Subject to any disclaimer, the term of this patent is extended or adjusted under 35 U.S.C. 154(b) by 0 days.

(21) Appl. No.: 14/373,210

(22) PCT Filed: Feb. 29, 2012

(86) PCT No.: PCT/KR2012/001551
§ 371 (c)(1),
(2), (4) Date: Aug. 5, 2014

(87) PCT Pub. No.: WO2013/108954
PCT Pub. Date: Jul. 25, 2013

(65) Prior Publication Data
US 2015/0020131 A1    Jan. 15, 2015

(30) Foreign Application Priority Data

Jan. 20, 2012 (KR) .................. 10-2012-0006516
Feb. 15, 2012 (KR) .................. 10-2012-0015081

(51) Int. Cl.
*H04N 7/173*    (2011.01)
*H04N 21/2343*  (2011.01)
(Continued)

(52) U.S. Cl.
CPC . *H04N 21/234327* (2013.01); *H04N 21/2362* (2013.01); *H04N 21/2381* (2013.01);
(Continued)

(58) Field of Classification Search
CPC ..... H04N 21/234327; H04N 21/23602; H04N 21/4345; H04N 21/2362; H04N 21/2381; H04N 21/4381; H04N 21/440227
(Continued)

(56) References Cited

U.S. PATENT DOCUMENTS 5,144,425 A * 9/1992 Joseph .................. 375/240.05
6,263,022 B1 * 7/2001 Chen et al. ............ 375/240.03
(Continued)

FOREIGN PATENT DOCUMENTS

KR    10-2011-0014821 A    2/2001
KR    10-2008-0098328 A    11/2008
(Continued)

OTHER PUBLICATIONS

International Searching Authority, International Search Report for PCT/KR2012/001551 dated Dec. 5, 2012.

*Primary Examiner* — Michael B Pierorazio
(74) *Attorney, Agent, or Firm* — Sughrue Mion, PLLC

(57) ABSTRACT

The present invention relates to a method for transmitting and receiving program configuration information for a scalable ultra high definition (UHD) video service under the hybrid transmission environment, and to a method and apparatus for effectively transmitting scalar layer information, and more particularly, the present invention relates to a scheme for inserting group information for the scalable
(Continued)

layer of a base layer and an enhancement layer, which form a scalable UHD video, and transmission channel information into a program map table (PMT) or a package configuration table (PCT), and for transmitting same, and to a scalable layer information format for transmitting layer information with a smaller number of bits as possible when a packet header includes scalable layer information.

15 Claims, 18 Drawing Sheets

(51) Int. Cl.
    *H04N 21/236*     (2011.01)
    *H04N 21/434*     (2011.01)
    *H04N 21/2362*     (2011.01)
    *H04N 21/2381*     (2011.01)
    *H04N 21/438*     (2011.01)
    *H04N 21/4402*     (2011.01)

(52) U.S. Cl.
    CPC ... *H04N 21/23602* (2013.01); *H04N 21/4345* (2013.01); *H04N 21/4381* (2013.01); *H04N 21/440227* (2013.01)

(58) Field of Classification Search
    USPC .................................................. 725/109, 116
    See application file for complete search history.

(56) References Cited

U.S. PATENT DOCUMENTS

| | | | |
|---|---|---|---|
| 6,490,705 B1 * | 12/2002 | Boyce | 714/776 |
| 6,496,217 B1 * | 12/2002 | Piotrowski | 348/14.12 |
| 6,501,797 B1 * | 12/2002 | van der Schaar et al. | 375/240.12 |
| 6,674,477 B1 * | 1/2004 | Yamaguchi et al. | 348/387.1 |
| 7,095,782 B1 * | 8/2006 | Cohen et al. | 375/240.01 |
| 7,383,346 B2 * | 6/2008 | Gemmell | H04L 29/06027 375/E7.012 |
| 7,958,532 B2 * | 6/2011 | Paul et al. | 725/90 |
| 8,064,389 B2 * | 11/2011 | Khan et al. | 370/329 |
| 8,072,943 B2 * | 12/2011 | Khan et al. | 370/335 |
| 2002/0116473 A1 * | 8/2002 | Gemmell | H04L 29/06027 709/219 |
| 2004/0261113 A1 * | 12/2004 | Paul | H04N 21/23432 725/90 |
| 2008/0170630 A1 * | 7/2008 | Falik et al. | 375/240.29 |
| 2009/0034629 A1 * | 2/2009 | Suh et al. | 375/240.27 |
| 2009/0187960 A1 * | 7/2009 | Lee et al. | 725/131 |
| 2009/0222855 A1 * | 9/2009 | Vare et al. | 725/39 |
| 2009/0268806 A1 * | 10/2009 | Kim et al. | 375/240.01 |
| 2009/0313673 A1 * | 12/2009 | Grozis | H04N 21/23418 725/118 |
| 2010/0061466 A1 * | 3/2010 | Gozen | G10L 19/167 375/240.28 |
| 2010/0260254 A1 * | 10/2010 | Kimmich et al. | 375/240.01 |
| 2010/0260268 A1 * | 10/2010 | Cowan et al. | 375/240.25 |
| 2011/0002397 A1 * | 1/2011 | Wang et al. | 375/240.26 |
| 2011/0038386 A1 * | 2/2011 | Berthelot | H04N 21/23432 370/474 |
| 2011/0096828 A1 * | 4/2011 | Chen et al. | 375/240.02 |
| 2011/0164683 A1 * | 7/2011 | Takahashi et al. | 375/240.16 |
| 2011/0239078 A1 * | 9/2011 | Luby et al. | 714/752 |
| 2011/0289542 A1 * | 11/2011 | Kitazato | H04N 21/2625 725/115 |
| 2012/0185907 A1 * | 7/2012 | Park et al. | 725/110 |
| 2012/0297266 A1 * | 11/2012 | Xu | H04L 1/0045 714/752 |

FOREIGN PATENT DOCUMENTS

| | | |
|---|---|---|
| KR | 10-2010-0065017 A | 6/2010 |
| KR | 10-2011-0117033 A | 10/2011 |

* cited by examiner

Fig. 4

| Syntax | No. of bits | Mnemonic |
|---|---|---|
| Extended_TS_program_map_section(){ | | |
| table_id | 8 | uimsbf |
| section_syntax_indicator | 1 | bslbf |
| '0' | 1 | bslbf |
| reserved | 4 | bslbf |
| section_length | 12 | uimsbf |
| program_number | 16 | uimsbf |
| version_number | 5 | uimsbf |
| current_next_indicator | 1 | bslbf |
| section_number | 8 | uimsbf |
| last_section_number | 8 | uimsbf |
| reserved | 5 | bslbf |
| PCR_PID | 13 | uimsbf |
| program_info_length | 12 | uimsbf |
| for(i=0;i<N; i++) { | | |
| program_descriptor() | | |
| } | | |
| number_of_PES_groups | 8 | bslbf |
| for(j=0;j<number_of_PES_groups; j++) { | | |
| PES_group_id | 16 | uimsbf |
| PES_group_flow_type | 2 | bslbf |
| reserved | 4 | bslbf |
| number_of_ES | 8 | bslbf |
| for(k=0;k<number_of_ES; k++) { | | |
| stream_type | 8 | uimsbf |
| reserved | 3 | bslbf |
| Elementary_PID | 13 | uimsbf |
| ES_info_length | 12 | uimsbf |
| for(l=0;l<number_of_ES_descriptor; l++) { | | |
| ES_descriptor() | | |
| } | | |
| } | | |
| } | | |
| CRC_32 | 32 | rpchof |
| } | | |

(labels: 410, 420, 430, 440, 450, 460)

Fig. 5

| value | PSI Table_id |
|---|---|
| 0x00 | Program_association_section |
| 0x01 | Conditional_access_section |
| 0x02 | TS_program_map_section |
| ... | ... |
| 0x08 | Extended_TS_program_map_section |
| 0x09 ~ 0x3F | reserved |
| 0x40 ~ 0xFE | user private |

| value | PES_group_flow_type |
|---|---|
| 0 | RF broadcast |
| 1 | IPv4 |
| 2 | IPv6 |
| 3 | reserved |

Fig. 9

| | Syntax | NO. og bits | Mnemonic |
|---|---|---|---|
| | Package_configuration_table(){ | | |
| |     table_id | 8 | unmsbf |
| |     version_numer | 5 | unmsbf |
| |     reserved | 4 | bslbf |
| |     Package_info_length | 12 | unmsbf |
| |     for(i=0;i< number_of_package_descriptor;i++){ | | |
| |         package_descriptor() | | |
| |     } | | |
| 910 |     number_of_asset_groups | 8 | bslbf |
| |     for(j=0;j< number_of_asset_groups;j++){ | | |
| 920 |         asset_group_id | 16 | unmsbf |
| 930 |         asset_group_flow_type | 2 | bslbf |
| 940 |         number_of_asset | 8 | bslbf |
| |         for(k=0; k< number_of_asset;k++){ | | |
| 950 |             asset_type | 16 | unmsbf |
| 960 |             asset_id | 16 | unmsbf |
| |             reserved | 5 | bslbf |
| |             asse:_info_length | 12 | unmsbf |
| |             for(l=0;l< number_of_asset_descriptor;l++){ | | |
| |                 asse:_descripto() | | |
| |             } | | |
| |         } | | |
| |     }CRC_32 | 32 | rpchof |
| | } | | |

Fig. 12

| layer_id | 0 | layer_id | 1 | layer_id | 2 | layer_id | 3 |
|---|---|---|---|---|---|---|---|
| priority_id | 0 | priority_id | 2 | priority_id | 3 | priority_id | 1 |
| dependency_id | 0 | dependency_id | 0 | dependency_id | 0 | dependency_id | 1 |
| temporal_id | 0 | temporal_id | 0 | temporal_id | 0 | temporal_id | 0 |
| quality_id | 0 | quality_id | 1 | quality_id | 2 | quality_id | 0 |
| layer_id | 4 | layer_id | 5 | layer_id | 6 | layer_id | 7 |
| priority_id | 8 | priority_id | 9 | priority_id | 0 | priority_id | 4 |
| dependency_id | 1 | dependency_id | 1 | dependency_id | 0 | dependency_id | 0 |
| temporal_id | 0 | temporal_id | 0 | temporal_id | 1 | temporal_id | 1 |
| quality_id | 1 | quality_id | 2 | quality_id | 0 | quality_id | 1 |
| layer_id | 8 | layer_id | 9 | layer_id | 10 | layer_id | 11 |
| priority_id | 5 | priority_id | 1 | priority_id | 8 | priority_id | 9 |
| dependency_id | 0 | dependency_id | 1 | dependency_id | 1 | dependency_id | 1 |
| temporal_id | 1 | temporal_id | 1 | temporal_id | 1 | temporal_id | 1 |
| quality_id | 2 | quality_id | 0 | quality_id | 1 | quality_id | 2 |
| layer_id | 12 | layer_id | 13 | layer_id | 14 | layer_id | 15 |
| priority_id | 0 | priority_id | 6 | priority_id | 7 | priority_id | 1 |
| dependency_id | 0 | dependency_id | 0 | dependency_id | 0 | dependency_id | 1 |
| temporal_id | 2 | temporal_id | 2 | temporal_id | 2 | temporal_id | 2 |
| quality_id | 0 | quality_id | 1 | quality_id | 2 | quality_id | 0 |
| | | layer_id | 16 | layer_id | 17 | | |
| | | priority_id | 8 | priority_id | 8 | | |
| | | dependency_id | 1 | dependency_id | 1 | | |
| | | temporal_id | 2 | temporal_id | 2 | | |
| | | quality_id | 1 | quality_id | 2 | | |

Fig. 14

| Syntax | NO. of bits | Mnemonic |
|---|---|---|
| Scalable_layer_listup_information(){ | | |
| 1410    num_of_layers | 10 | bslbf |
|     for (i=0;i<=num_of_layers;i++){ | | |
| 1420        layer_id | 10 | unmsbf |
| 1430        priority_id | 6 | unmsbf |
| 1440        dependency_id | 3 | unmsbf |
| 1450        temporal_id | 3 | unmsbf |
| 1460        quality_id | 4 | unmsbf |
|     } | | |
|   reserved | 4 | bslbf |
| } | | |

Fig. 15

| Syntax | NO. of bits | Mnemonic |
|---|---|---|
| Med a fragment_unit_header(){ | | |
| ...//other syntax | | |
| layer_info_flag | 1 | bslbf |
| if(layer_info_flag=='1'){ | | |
| layer_type | 2 | bslbf |
| ...//other syntax | | |
| if(layer_type=='1'){ | | |
| layer_id_present_flag | 1 | bslbf |
| layer_id_extension_flag | 1 | bslbf |
| if(layer_id_present_flag=='1'){ | | |
| if(layer_id_extension_flag=='1'){ | | |
| layer_id_10bits | 10 | unmsbf |
| }else{ | | |
| layer_id_5bits | 5 | unmsbf |
| } | | |
| }else{ | | |
| prority_id | 6 | unmsbf |
| dependency_id | 3 | unmsbf |
| temporal_id | 3 | unmsbf |
| quality_id | 4 | unmsbf |
| } | | |
| } | | |
| ...//other syntax | | |
| byte_align_reserved_bits | 4 | bslbf |
| : | | |
| } | | |

1510 — layer_id_present_flag
1520 — layer_id_extension_flag
1530 — layer_id_10bits
1540 — layer_id_5bits

Fig. 16

| Syntax | NO. of bits | Mnemonic |
|---|---|---|
| Scalable_layer_listup_information(){ | | |
|     num_of_layers | 10 | bslbf |
|     bits_of_layer_id= ceil(log$_2$(num_of_layers)) | | |
|     for (i=0;i<=num_of_layers;i++){ | | |
|         layer_id | | unmsbf |
|         priority_id | 6 | unmsbf |
|         dependency_id | 3 | unmsbf |
|         temporal_id | 3 | unmsbf |
|         quality_id | 4 | unmsbf |
|     } | | |
|     byte_align_reserved_bits | | bslbf |
| } | | |

- 1610: num_of_layers
- 1620: bits_of_layer_id
- 1630: layer_id
- 1640: priority_id
- 1650: dependency_id
- 1660: temporal_id
- 1670: quality_id

Fig. 17

| Syntax | NO. of bits | Mnemonic |
|---|---|---|
| Media fragment_unit_header(){ | | |
| .../ /other syntax | | |
|   layer_info_flag | 1 | bslbf |
|   if(layer_info_flag=='1'){ | | |
|     layer_type | 2 | bslbf |
|     .../ /other syntax | | |
|     if(layer_type=='1'){ | | |
|       layer_id_present_flag | 1 | bslbf |
|       if(layer_id_present_flag=='1'){ | | |
|         layer_id | | unmsbf |
|       }else{ | | |
|         prority_id | 6 | unmsbf |
|         dependency_id | 3 | unmsbf |
|         temporal_id | 3 | unmsbf |
|         quality_id | 4 | unmsbf |
|       } | | |
|     .../ /other syntax | | |
|     byte_aign_reserved_bits | 4 | bslbf |
|   } | | |
| } | | |

1710 — layer_info_flag
1720 — layer_type
1730 — layer_id_present_flag
1740 — layer_id
1750 — prority_id
1760 — dependency_id
1770 — temporal_id
1780 — quality_id

Fig. 18

| Syntax | NO. of bits | Mnemonic |
|---|---|---|
| Scalable_layer_listup_information(){ | | |
|    num_of_layers | 10 | bslbf |
|    max_priority_id_len | 6 | bslbf |
|    max_dependency_id_len | 3 | bslbf |
|    max_temporal)id_len | 3 | bslbf |
|    max-quality_id_len | 4 | bslbf |
|    bits_of_layer_id= ceil(log$_2$(num_of_layers)) | | |
|    bits_of_priority_id= ceil(log$_2$(max_priority_len)) | | |
|    bits_of_dependency_id= ceil(log$_2$(max_dependency_len)) | | |
|    bits_of_temporal_id= ceil(log$_2$(max_temporal_len)) | | |
|    bits_of_quality_id= ceil(log$_2$(max_quality_len)) | | |
|    for (i=0;i<=num_of_layers;i++){ | | |
|       layer_id | | unmsbf |
|       prority id | | unmsbf |
|       dependency_id | | unmsbf |
|       temporal_id | | unmsbf |
|       quality_id | | unmsbf |
|    } | | |
|    byte_align_reserved_bits | | bslbf |
| } | | |

(1802: num_of_layers; 1804: max_priority_id_len; 1806: max_dependency_id_len; 1808: max_temporal)id_len; 1810: max-quality_id_len; 1812: bits_of_layer_id; 1814: bits_of_priority_id; 1816: bits_of_dependency_id; 1818: bits_of_temporal_id; 1820: bits_of_quality_id; 1822: for loop; 1824: layer_id; 1826: prority id; 1828: dependency_id; 1830: temporal_id; 1832: quality_id; 1834: byte_align_reserved_bits)

METHOD FOR TRANSMITTING AND RECEIVING PROGRAM CONFIGURATION INFORMATION FOR SCALABLE ULTRA HIGH DEFINITION VIDEO SERVICE IN HYBRID TRANSMISSION ENVIRONMENT, AND METHOD AND APPARATUS FOR EFFECTIVELY TRANSMITTING SCALAR LAYER INFORMATION

CROSS REFERENCE TO RELATED APPLICATIONS

This application is a National Stage of International Application No. PCT/KR2012/001551 filed Feb. 29, 2014, claiming priority based on Korean Patent Application Nos. 10-2012-0006516 filed Jan. 20, 2012 and 10-2012-0015081 filed Feb. 15, 2012, the contents of all of which are incorporated herein by reference in their entirety.

TECHNICAL FIELD

The present invention relates to a method for transmitting and receiving program configuration information for scalable ultra high definition video service under the hybrid transmission environment, and a method and an apparatus for effectively transmitting scalar layer information, and more particularly, to a scheme for inserting group information for the scalable layer of a base layer and an enhancement layer, which form a scalable UHD video, and transmission channel information into a program map table (PMT) or a package configuration table (PCT), and for transmitting same, and to a scalable layer information format for transmitting layer information with a smaller number of bits as possible when a packet header includes scalable layer information.

BACKGROUND ART

MPEG-2 systems perform packetizing and multiplexing processes for storing or transmitting the elementary stream (ES) generated by the video and audio encoder. Packetizing and multiplexing processes are largely classified into two types.

One is a process for producing a program stream (PS) to be stored in a storage medium; the other one is a process for producing a transport stream (TS) for network transmission or broadcasting.

When a scalable UHD video is being transmitted via the hybrid network, group information and transmission channel information of the scalable UHD video should be inserted into the program map table (PMT) which configures program specific information (PSI) in the MPEG-2 system.

According to an existing method for providing program information, only program information for a media being transmitted via a single channel broadcasting network has been provided through the PMT. However, in a converging environment, program information on a media which simultaneously uses both a broadcasting network, which is not a single channel of the broadcasting network, and an IP network, which is an augmentation channel, cannot be provided through a conventional PMT.

Accordingly, for a media having a hybrid transmission environment, transmission channel information on the media and group information between the media, which are being transmitted to each transmission channel, should be provided in an extended PMT.

Furthermore, future digital broadcasting is expected to develop into UHD broadcasting which requires high transmission capacity, multi-view 3D video broadcasting, and the like. Accordingly, standardization on MPEG media transport (MMT) is in progress as a study for a more efficient transmission format than the existing MPEG-2 TS.

MPEG media transport (MMT) is a new standard initiated to overcome the inefficiency occurring under the new environment wherein networks having transport stream (TS) of existing MPEG-2 system standards are ALL-IP networks.

The scope of MMT, which is being standardized, can be divided into three parts: encapsulation, delivery, and control. Hereinafter these will be investigated in detail.

In the encapsulation part, storage format for storing compressed media data or payload format for transmission are defined. There are three types of specific layers which are included in encapsulation: E.3 (MFU, i.e. Media Fragment Unit), E.2 (M-Unit), and E.3 (MMT Asset). In E.3 layer, a compressed media data is divided into slices or pictures and encapsulated. In E.2 layer, an access unit (AU) is produced by encapsulating E.3 layer. In E.1 layer, a transmission packet is produced by encapsulating E.2 layer.

In the delivery part, functions necessary for delivering an encapsulated media data from one network entity to other entity are defined. In the control part, functions are provided for controlling delivery and consumption of the media.

In the conventional method for providing layer information, maximum bits are inserted into the MFU header and provided without considering overlapping among the values representing a priority value (priority id), a resolution level (dependency id), a time level (temporal id), and a picture quality level (quality id). However, there is a high possibility of existence of overlapped information in layer information which contains scalable UHD video data.

When transmitted without considering such overlapped layer information, unnecessary bits are consumed since layer information containing larger data than layer information just containing actual scalable UHD video data is transmitted.

Thus, for a future MMT, a method that can provide group information on the scalable UHD video being transmitted under the hybrid transmission environment and channel information on each transmission environment is needed.

In addition, it is necessary to provide a method for inserting a layer identifier (layer id) representing layer information on each layer as separate information considering overlapping of layer information that is contained in the scalable UHD video data when the scalable UHD video data is being transmitted.

SUMMARY OF INVENTION

Technical Problem

An objective of the present invention is to provide a method for supporting a scalable UHD video service under the hybrid transmission environment.

Another objective of the present invention is to provide a method for supporting a scalable UHD video service under the hybrid transmission environment by utilizing MPEG-2 TS.

Yet another objective of the present invention is to provide a method for supporting a scalable UHD video service under the hybrid transmission environment by utilizing MMT which is undergoing a standardization process as a new transmission format.

Yet another objective of the present invention is to provide a method for inserting layer identifier (id) representing layer information on each layer considering overlapping of layer information that is contained in the scalable UHD video data when the scalable UHD video data is being transmitted.

Yet another objective of the present invention is to provide a method for effectively transmitting layer information that is contained in the scalable UHD video data.

Solution to Problem

To achieve this, a method for transmitting program configuration information of the present invention includes the steps of: creating a base layer packet and an enhancement layer packet, which include a base layer and at least one enhancement layer respectively, from the scalable video coding bit stream which includes a base layer and at least one enhancement layer; creating a program configuration information which is a configuration information on a base layer packet and an enhancement layer packet; and transmitting created said program configuration information, that is to be included in said base layer packet, to the receiving end via the broadcasting network.

To achieve this, a method for receiving program configuration information of the present invention includes the steps of: receiving a base layer packet, which includes a base layer, created from the scalable video coding bit stream which includes a base layer and at least one enhancement layer; extracting a program configuration information, which is a configuration information on the enhancement layer packet which includes said base layer packet and at least enhancement layer, from the received base layer packet; and obtaining information on the number of created packets and transmission paths thereof from said program configuration information To achieve this, a method for transmitting scalable layer information of the present invention includes the steps of: creating a scalable video stream, which includes a base layer and at least one enhancement layer, based on MPEG media transport (MMT); creating a scalable layer list-up information which manages layer information which configures said scalable video stream, wherein said scalable layer list-up information includes layer information on the individual layer of the scalable video stream and the layer identifier representing layer information.

To achieve this, an apparatus for creating header of a media fragment unit (MFU) of an MPEG media transport (MMT) packet of the present invention selectively refers to layer identifiers from scalable layer list-up information which manages layer information contained in the scalable video stream through the header of said MFU, which is the unit of said MMT packet; and said layer identifiers selectively exist as a base layer identifier having a fixed number of bits and an extended layer identifier.

Advantageous Effects of Invention

The present invention provides a transmission method for scalable UHD video service under the hybrid transmission environment by adding PMT in MPEG-2 TS, and by inserting transmission channel information and configuration information into the added PMT related to the media being transmitted. Thus, it is advantageous in that information on the media being transmitted under the hybrid transmission environment may be transmitted using the added PMT without changing the existing syntax and the meaning thereof, and MMT which is undergoing standardization as a new transmission format may also transmit information on the media being transmitted under the hybrid transmission environment using PCT which is a package configuration table.

In addition, when a scalable UHD video is being transmitted, the present invention may insert scalable layer list-up information which manages multi-layer information contained in the scalable UHD video once for every specific period as a form of MFU payload, and may provide layer information by referring scalable layer list-up information in MFU which is the smallest unit of MMT transmission packet.

In addition, for layer information being managed through scalable layer list-up information, there are priority value, resolution level, temporal level, and quality level which belong to each layer, and such layer information may be represented as a layer identifier. Thus, when each layer has overlapped layer information, unnecessary bit consumption for overlapped layer information may be reduced, and unlike existing method which unconditionally allocates maximum bits, unnecessary bit consumption may be reduced through variable bit allocation, wherein layer identifiers are adaptively allocated to the total number of the scalable layers that are contained in the scalable UHD video stream in a fixed or a variable bit length, and layer information on each layer is also being allocated in bits reflecting actual level value of layer information.

Moreover, layer information which is contained in the scalable UHD video may be effectively transmitted by selectively referring representing layer identifier related to each layer information which is contained in scalable list-up information in MFU header.

BRIEF DESCRIPTION OF DRAWINGS

FIG. 4 is an extended PMT syntax containing transmission channel information and group information related to each layer of the scalable UHD video that is being transmitted under the hybrid transmission environment.

FIG. 5 shows added PSI table values and transmission channel type information.

FIG. 9 is a package configuration table of an MMT which contains transmission channel information and group information related to each layer of the scalable UHD video which is being transmitted under the hybrid transmission environment.

FIG. 12 illustrates a layer identifier representing multi-layer information which configures a scalable video stream according to an exemplary embodiment of the present invention;

FIG. 14 illustrates syntax of scalable list-up information for presenting the layer identifier values representing layer information which is contained in the scalable video stream as base layer identifiers and extended layer identifiers both having fixed bit lengths according to an exemplary embodiment of the present invention;

FIG. 15 illustrates the syntax of an MFU header designed for referring layer information of scalable layer list-up information with a base and an extended layer identifiers both having fixed bit lengths;

FIG. 16 illustrates the syntax of scalable list-up information for presenting the layer identifier values representing layer information which is contained in the scalable video stream as a layer identifier having a variable bit length;

FIG. 17 illustrates the syntax of an MFU header designed for referring layer identifier having a variable bit length;

FIG. 18 illustrate the syntax of scalable list-up information for presenting the layer identifier values representing layer information, which is contained in the scalable video stream, as a layer identifier having a variable bit length, and also for allocating layer information, which is contained in the layer identifier, by bits having a variable length.

DESCRIPTION OF EMBODIMENTS

Described above and additional features of the present invention will be more apparent through the preferred exemplary embodiments with reference to the accompanying drawings. Hereinafter the present invention will be described in detail for the person of ordinary skill in the art shall readily understand and reproduce through such exemplary embodiments.

Figure 1:
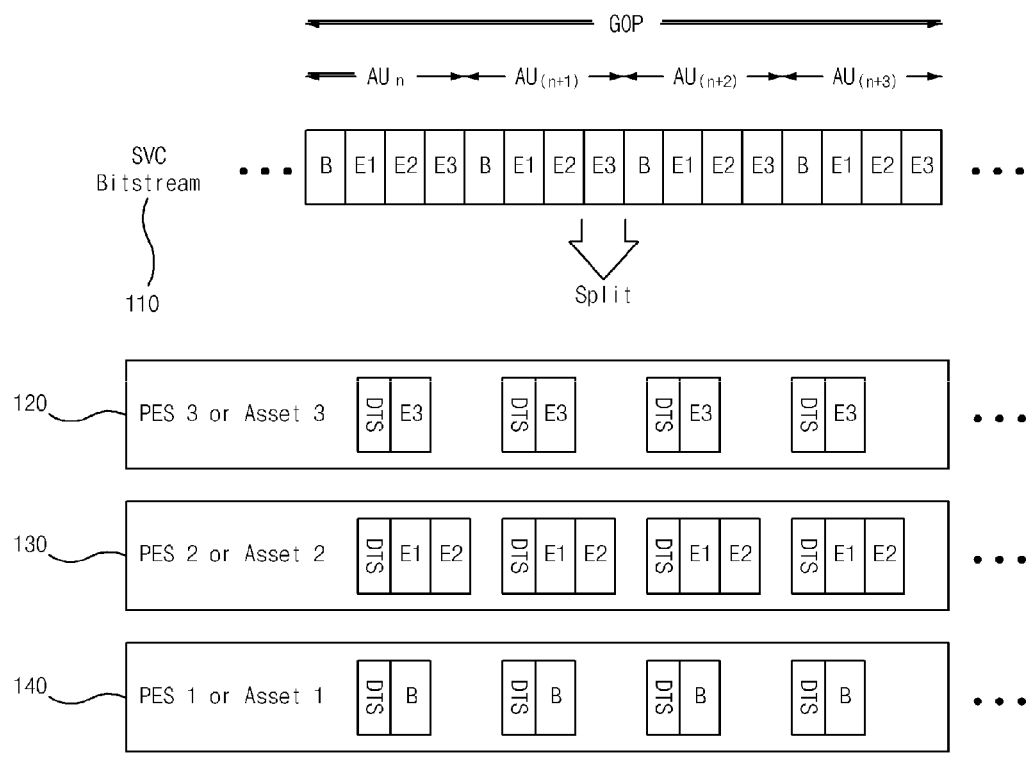
FIG. 1 illustrates a packetizing process by layer for a scalable UHD video stream according to an exemplary embodiment of the present invention.

FIG. 1 illustrates a packetizing process by layer for a scalable UHD video stream according to an exemplary embodiment of the present invention. Hereinafter the packetizing process by layer for a scalable UHD video stream according to an exemplary embodiment of the present invention will be investigated in detail using FIG. 1.

The stream 110 encoded with a scalable UHD video is an elementary stream (ES) which contains video data on abase layer and an enhancement layer According to FIG. 1, it can be seen that the elementary stream contains video data on a base layer and three enhancement layers. An ES of a scalable UHD video may be configured as a packetized form by layer. Such a packetized form is called 'packetized ES (PES)' in MPEG system standards.

In FIG. 1, an ES, which is divided into a total of three PESs, is illustrated. In other words, PES 1 contains a base layer, PES 2 contains a first enhancement layer and a second enhancement layer, and PES 3 layer contains a third enhancement layer. A decoding time stamp (DTS) contains synchronization information for synchronizing PES received from the receiving end.

Figure 2:
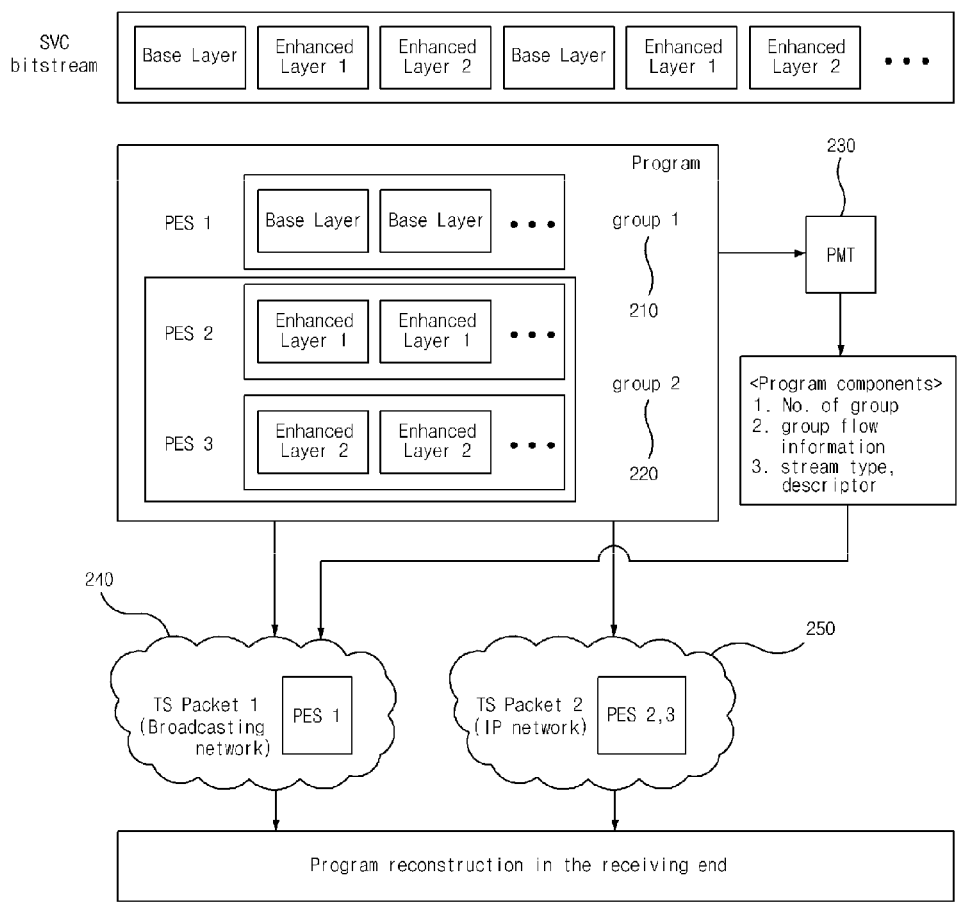
FIG. 2 illustrates a method for multiplexing a scalable UHD video stream into an MPEG-2 transport stream and transmitting thereof according to an exemplary embodiment of the present invention.

FIG. 2 illustrates a process for multiplexing a scalable UHD video stream into an MPEG-2 transport stream and transmitting thereof according to an exemplary embodiment of the present invention. Hereinafter the process for multiplexing a scalable UHD video stream into an MPEG-2 transport stream and transmitting thereof according to an exemplary embodiment of the present invention will be investigated in detail using FIG. 2.

The PES 1 140 in FIG. 1 is classified as a group 1 210, the PES 2 and PES 3 140, 130 may be classified as a group 2 220. Each grouped PES packets are divided into a TS packet 1 240 containing PES 1 being transmitted to the broadcasting network, and a TS packet 2 250 containing PES 2 and PES 3 which are being transmitted via the IP network.

Thus, a scalable UHD video may be transmitted under the hybrid transmission environment including a broadcasting network and an IP network. However, a problem occurs that the program configuration information configured in the transmitting end cannot be identified in advance in the receiving end. In order to solve such a problem, a TS packet 1 240 is transmitted with PMT 230, which is program configuration information, being loaded thereon. Thus, according to the present invention, PMT, which is program configuration information, is transmitted via either a broadcasting network or an IP network; the present invention will be described concentrating on transmitting via the broadcasting network.

The transmitted PMT 230 contains the TS packet 1 240 being transmitted under the hybrid transmission environment, information on ES being contained in the TS packet 2 250, transmission channel information, and contains group information; thus, by receiving PMT, the receiving end can identify the program configuration information configured in the transmitting end in advance.

Figure 3:
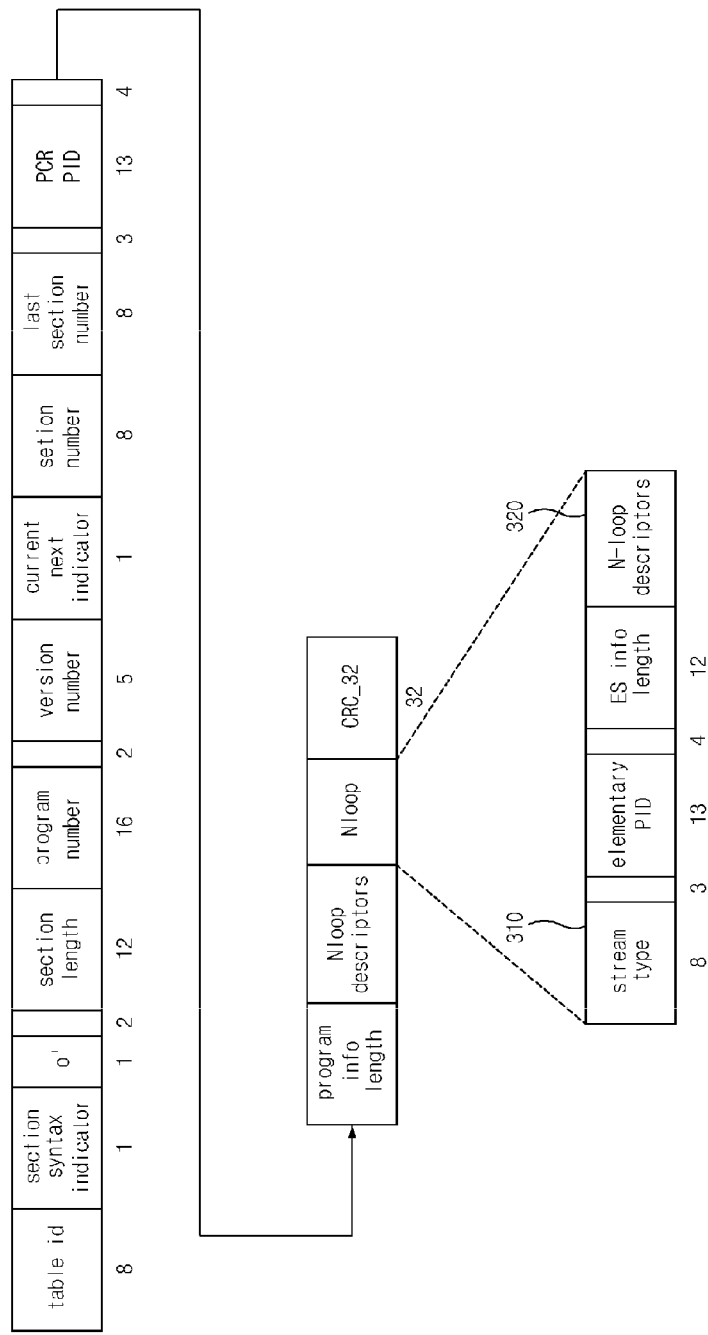
FIG. 3 is a block diagram of a program map table (PMT) which configures PSI according to an exemplary embodiment of the present invention.

FIG. 3 is a block diagram of a program map table (PMT) which configures PSI according to an exemplary embodiment of the present invention. Hereinafter configuration of the program map table (PMT) which configures PSI according to an exemplary embodiment of the present invention will be investigated in detail using FIG. 3.

As shown in FIG. 2, a PMT is multiplexed simultaneously when the MPEG-2 TS is multiplexed. Thus, an ES encoding type information 310 and information on a descriptor 320 for the ES are provided to the receiving end.

To investigate in detail about FIG. 3, the PMT contains a table identifier, a section syntax indicator, a section length, a program number, a version number, a current next indicator, a section number, a last section number, a PCR PID, a program information length, an N loop descriptor, an N loop, and a CRC. In addition, the N loop contains a stream type, a base PID, an ES information length, and an N-loop descriptor. FIG. 3 will be investigated in detail in FIG. 4 which will be described hereinafter.

FIG. 4 is an extended PMT syntax containing transmission channel information and group information related to each layer of the scalable UHD video that is being transmitted under the hybrid transmission environment according to an exemplary embodiment of the present invention. Hereinafter the extended PMT syntax containing transmission channel information and group information related to each layer of the scalable UHD video that is being transmitted under the hybrid transmission environment according to an exemplary embodiment of the present invention will be investigated using FIG. 4.

The extended PMT syntax is recognized through the new table identifier values where the separated syntax is added thereto while maintaining the existing PMT. The extended PMT provides group information (for an example, number of groups) 420 on the PES which is packetized according to the layer data contained in the scalable UHD video stream, and a PES group identifier 430. In addition, the additionally extended PMT syntax contains transmission channel type information 440 on PES group since transmission type is differently assigned to PES group. Transmission channel type information is information about whether the PES group is transmitted via a broadcasting network or an IP network.

When the transmission type information 440 is determined for each PES group: the number of elementary stream (ES) 450 being included in the one PES group and encoding information 460 of each ES are provided; PID values are assigned to the ES; and a descriptor necessary for analyzing the ES is provided.

FIG. 5 shows added PSI table values and transmission channel type information according to an exemplary embodiment of the present invention.

As mentioned above, since the extended PMT syntax is newly added while the existing PMT syntax is maintained, a new identifier meaning the extended PMT syntax is provided as illustrated in FIG. 5. For an example, the added new identifier is 0X08, which means an extended PMT syntax. Table identifier is used in a UHD video stream being transmitted under the hybrid transmission environment.

If the corresponding value of transmission type information for a PES group is '0,' it represents transmission via a broadcasting network; if it is '1,' it represents transmission via an IPv4 network; and if it is '2,' it represents transmission via an IPv6 network.

Figure 6:
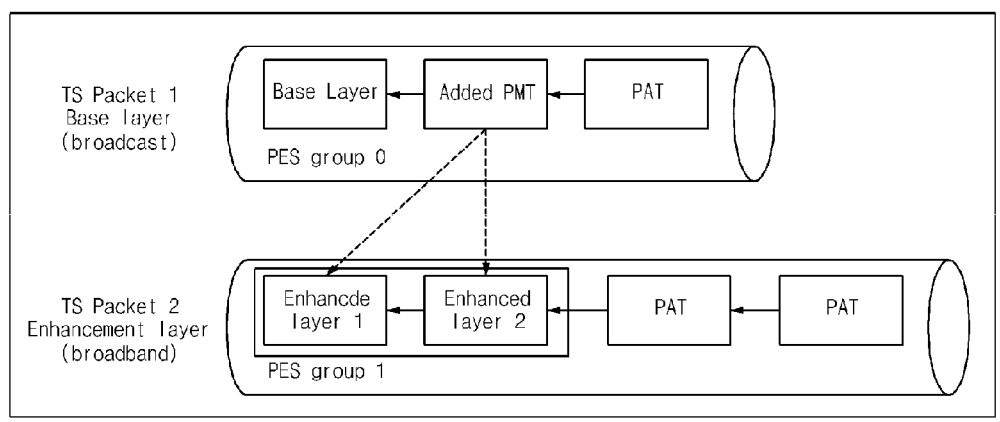
FIG. 6 shows a transmission process of the extended PMT syntax according to an exemplary embodiment of the present invention.

FIG. 6 illustrates a transmission process of the extended PMT syntax according to an exemplary embodiment of the present invention. Hereinafter the transmission process of the extended PMT syntax according to an exemplary embodiment of the present invention will be investigated in detail using FIG. 6.

According to FIG. 6, the extended PMT syntax is multiplexed with the PES group 0 and transmitted via a broadcasting network, and the PES group 1 and the PES group 2 are transmitted via an IP network. The receiving end may identify, as described above, the number of group, transmission type information for each group, the stream type (encoding information), and the descriptor using the extended PMT syntax received via the broadcasting network.

Hereinafter a method for supporting a scalable UHD video service under the hybrid transmission environment by utilizing MMT which is undergoing a standardization process as a new transmission format will be investigated.

MPEG media transport (MMT) is a media transmission standard which is undergoing standardization in ISO/IEC JTC 1/SC 29/WG 11 (so-called 'Moving Picture Experts Group,' i.e. MPEG) for using in the future broadcasting and multimedia service such as a multi-function smart TV, a UHDTV (ultra HDTV), a multi-view TV, and the like instead of MPEG-2 transport stream (TS) which is being widely used worldwide nowadays in the field of digital broadcasting for duplexing a compressed audio and video data and transmitting same.

A technical objective of the MMT can be summarized as an IP friendly audio and video (AV) delivery, an AV delivery over the hybrid heterogeneous network, a cross-layer optimized AV delivery, an effective delivery for a large capacity AV, and the like. In other words, in a situation where AV delivery via internet is becoming more common, an IP friendly AV delivery may allow various equipments widespread due to the internet for being applied in broadcasting not only in the field of communication but also in the field of broadcasting, thereby reducing the cost thereof. Owing to the widespread wire and wireless internet accessibility, services converging broadcasting and communications are continuously emerging; above all, new services, which had been impossible in the past, will be possible by dividing and transmitting various components of the multimedia service thereof separately through the broadcasting network and the IP network, and through the proper coordination between the advantages and the disadvantages of data delivery through a broadcasting network and data delivery through an IP network. In addition, the network layer has been devoted in simplifying the design through the conceptual separation of the role; however, in order to maximally enhance QoS of the network service, the delivery requirements for the services from the higher network layers to the lower network layers will be delivered in detail. Compressed data of UHDTV having 4 times or 16 times more pixels compared to that of existing HDTV will be able to be delivered very effectively. Main application area of the MMT may be smart TVs, UHDTVs, and the like.

Figure 7:
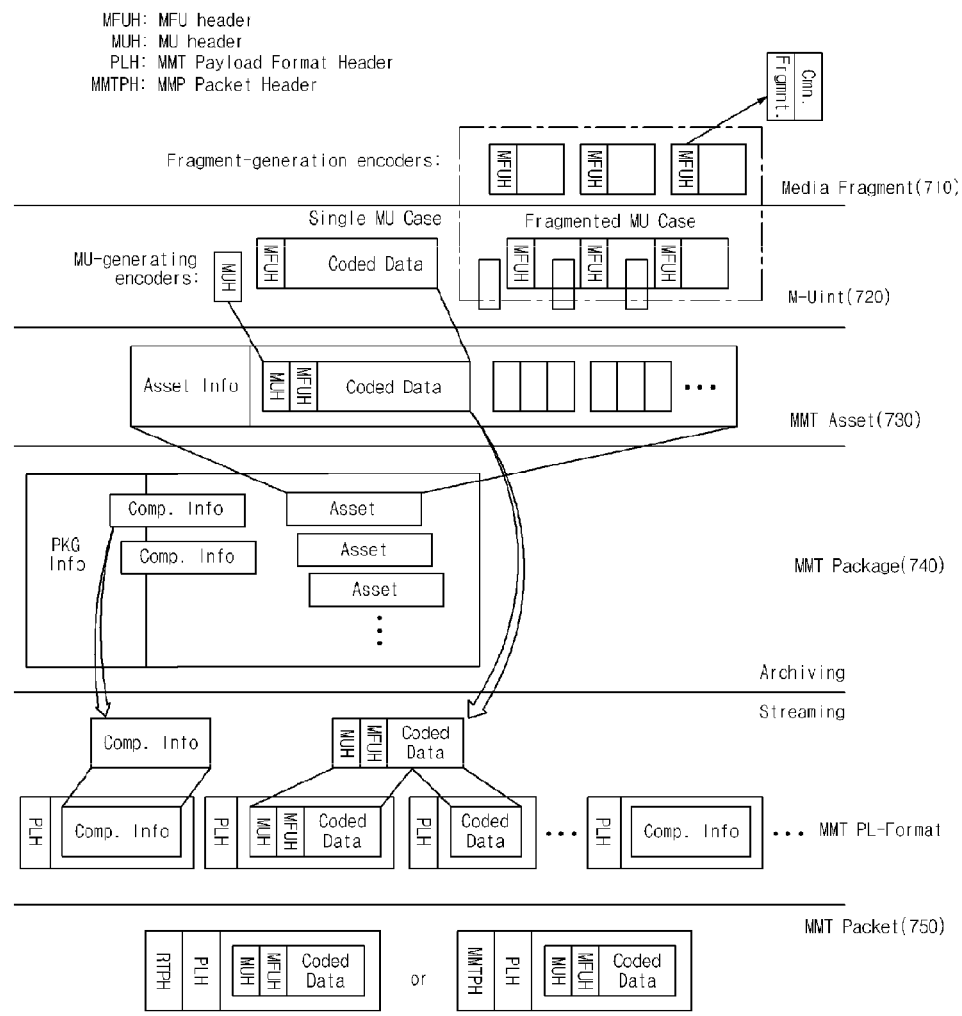
FIG. 7 shows a packetizing process for creating an MMT packet according to an exemplary embodiment of the present invention.

FIG. 7 illustrates a packetizing process for creating an MMT packet according to an exemplary embodiment of the present invention. Hereinafter the packetizing process for creating an MMT packet according to an exemplary embodiment of the present invention will be investigated in detail using FIG. 7.

According to FIG. 7, the MMT packet is created for storage or streaming; the media fragment unit (MFU) 710 is a unit which can represent each layer unit when a video stream containing multiple layers such as a scalable UHD video is existing.

A multiple number of MFUs 710 can be represented as M-Unit 720 which is encapsulated by AU; a multiple number of M-Units 720 can be represented as an MMT asset 730. An MMT asset 730 may be grouped with other assets, and may be able to be encapsulated as an MMT Package 740 which performs similar functions as a programming in an MPEG-2 system. Such an MMT package 740 contains configuration information and transmission information on the MMT assets 730.

Figure 8:
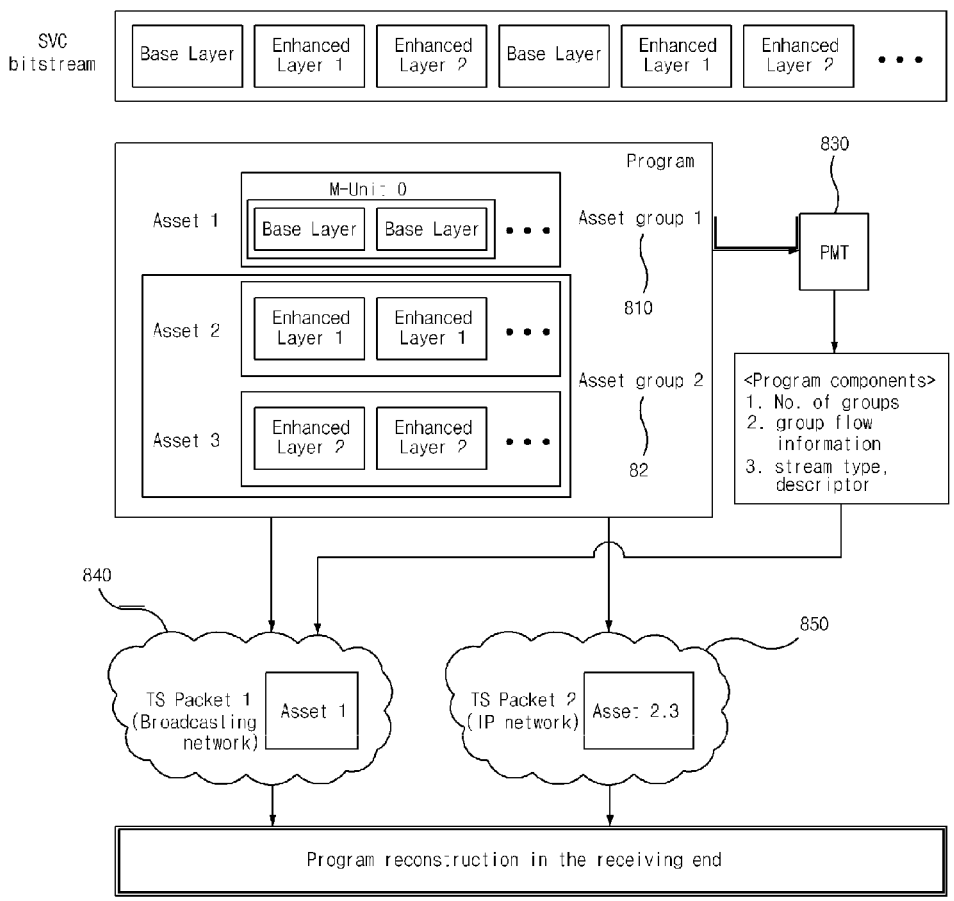
FIG. 8 shows a method for transmitting a scalable UHD video stream to MMT packet according to an exemplary embodiment of the present invention.

FIG. 8 illustrates a method for transmitting a scalable UHD video stream to MMT packet according to an exemplary embodiment of the present invention. Hereinafter the method for transmitting a scalable UHD video stream to MMT packet according to an exemplary embodiment of the present invention will be investigated in detail using FIG. 8.

According to FIG. 8, an MMT asset 1, which is packetized by the separated ES 810 of the scalable UHD video stream, is classified to a group 1 810, and the MMT assets 2 and 3 may be grouped as a group 2 820. Each grouped MMT assets are classified into an MMT packet 1 840 containing MMT asset 1 which is being transmitted via a broadcasting network and an MMT packet 2 850 containing MMT asset 1 containing an MMT asset 2 and an MMT asset 3 which is being transmitted via an IP network.

As described above, the scalable UHD is being transmitted under the hybrid transmission environment including a broadcasting network and an IP network.

However, a problem occurs such that configuration information on the MMT package 740 cannot be identified accurately in the receiving end prior to transmission thereof. In order to solve this problem, it is transmitted to the receiving end after duplexing MMT packet 1 840 with PCT 830 which is package configuration information. The PCT, which is package configuration information, contains an MMT packet 1 840, which is transmitted under the hybrid transmission environment, and information on ESs contained in the MMT packet 2 850 and channel information, and group information; the receiving end may restore the scalable UHD which is being received via the broadcasting network and the IP network by receiving PCT. As described above, the present invention transmits PCT, which is package configuration information, via a network, which is one among the broadcasting network and the IP network, more specifically, it is transmitted via the broadcasting network.

FIG. 9 illustrates a package configuration table (PCT) which contains transmission channel information and group information related to each layer of the scalable UHD video which is being transmitted under the hybrid transmission environment according to an exemplary embodiment of the present invention.

A PCT represent configuration information on an MMT package 740. In other words, according to the number of the asset groups 910 of the MMT asset 730 contained in the MMT package 740, an identifier value 920 of each asset group is assigned, and the transmission channel type information 930 is provided.

Encoding type information 950 of the MMT asset is provided according to the number of MMT asset 940 which is included in MMT asset 730 group, and MMT asset identifier 960 similar to Elementary PID of MPEG-2 TS is provided. Also, descriptor which is necessary in analyzing each MMT asset 730 is provided.

Figure 10:
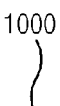
FIG. 10 shows transmission channel type information of an asset which is being used in a PCT of an MMT.

FIG. 10 shows transmission channel type information of an asset which is being used in a PCT of an MMT according to an exemplary embodiment of the present invention.

If transmission type information 1000 for MMT assets 730 group has a value of '0,' it represents transmission via a broadcasting network, and it has a value of '1' and '2,' it represents transmission via an IP network excluding any broadcasting network.

A method according to an exemplary embodiment of the present invention can be implemented in a form of a program instruction, which can be performed through the various computing means, and recorded in a computer readable media.

Said computer readable media may include a program instruction, a data file, a data structure, and the like, or any combinations thereof. Program instructions which are recorded in said media may be the ones specially designed and configured for the present invention, or the usable ones which has been publically known to a person skilled in the art in the field of computer software. Examples of the computer readable recording media include a hard disk, a magnetic media such as a floppy disk and a magnetic tape, a CD-ROM, an optical recording media such as a DVD, a magneto-optical media such as a floptical disk, and the hardware devices especially configured to store and perform program instructions such as a ROM, a RAM, a flash memory, and the like. Examples of the program instructions include not only machine language codes like the one generated by a compiler but also high level language codes which can be performed by a computer using an interpreter and the like. The above described hardware devices may be configured to operate as at least one software module in order to perform the operation of the present invention, and vice versa.

Figure 11:
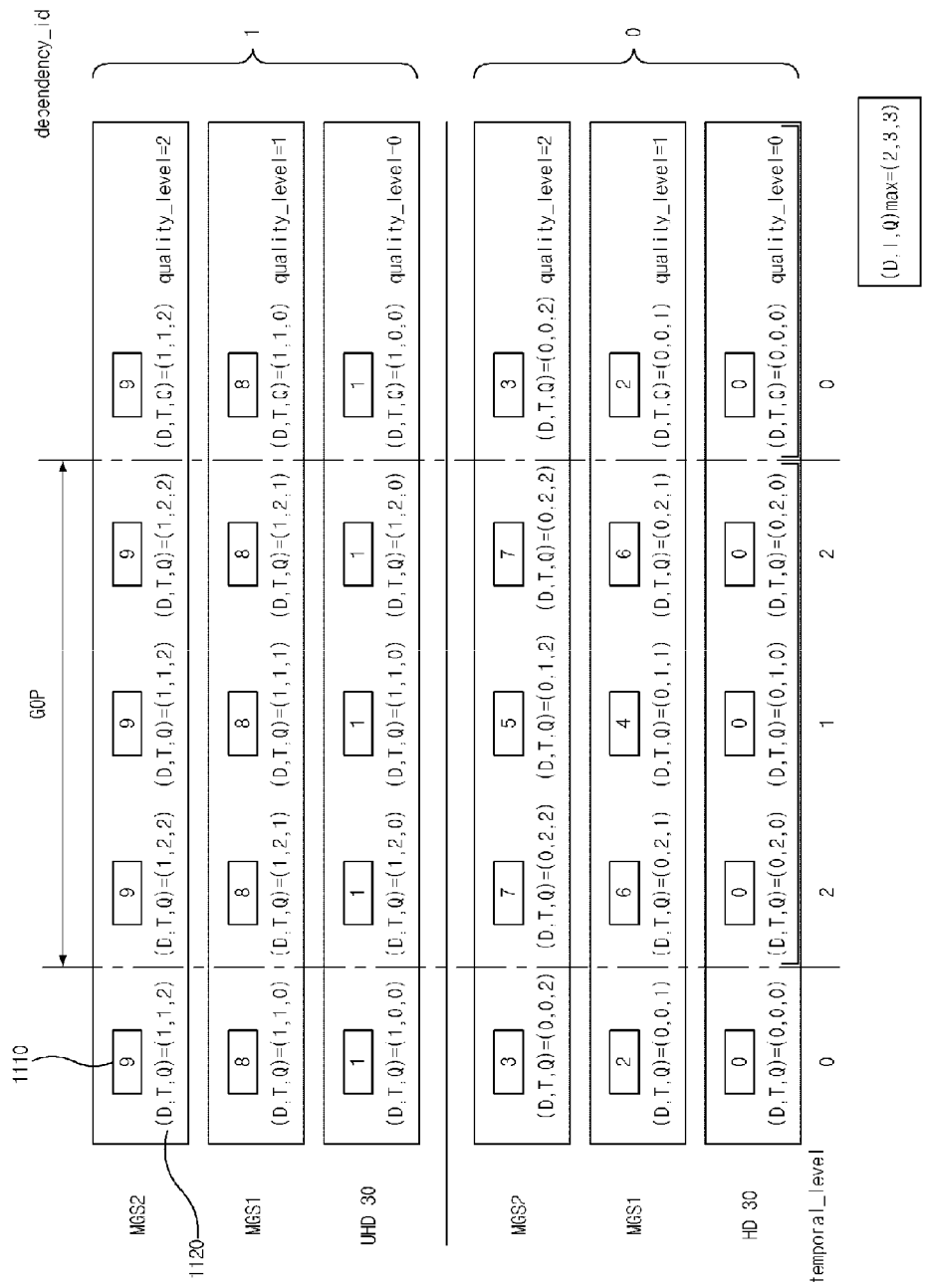
FIG. 11 illustrates multi-layer information which configures a scalable video stream according to an exemplary embodiment of the present invention.

FIG. 11 illustrates multi-layer information which is contained in a scalable UHD video stream according to an exemplary embodiment of the present invention. Hereinafter multi-layer information which is contained in a scalable UHD video stream according to an exemplary embodiment of the present invention will be investigated in detail using FIG. 11.

A scalable UHD video stream includes a priority identifier value (priority id) 1110 and a resolution level (dependency id) for each layer, a time level (temporal id), and layer information 1120 for a picture quality level (quality id).

The higher the priority identifier value 1110, the priority goes lower; layer information 1120 represents information on resolution level, temporal level, and quality level of the current layer.

Such priority identifier value 1110 and layer information 1120 for each layer become base information that can be serviced adaptively by selecting a resolution level, a temporal level, and a quality level suitable for the environment applied to the network.

FIG. 12 illustrates a layer identifier representing multi-layer information which is contained in a scalable UHD video stream according to an exemplary embodiment of the present invention. Hereinafter the layer identifier representing multi-layer information which is contained in a scalable UHD video stream according to an exemplary embodiment of the present invention will be investigated in detail using FIG. 12.

The priority identifier value 1110 and layer information 1120 for each layer illustrated in FIG. 11 may be represented by the layer identifier value suggested in the present invention. The layer identifier values in FIG. 12 mean the layer identifier values assigned considering overlap information from layer information on the 30 layers illustrated in FIG. 11.

The layer identifier value, which is information inserted into scalable layer list-up information, represents the priority identifier value 1110 and layer information 1120 for each layer. Unnecessary bit consumption can be reduced for the priority identifier value 1110 and layer information 1120 by using such layer identifier value. In other words, a layer identifier value is transmitted instead of transmitting a priority identifier value (priority id) 1110 and a resolution level (dependency id) for each layer, a time level (temporal id), and layer information 1120 on a picture quality level (quality id); a priority identifier value (priority id) 1110, a resolution level (dependency id), a time level (temporal id), and a picture quality level (quality id) for the corresponding layer are obtained in the receiving end using the received layer identifier value.

Figure 13:
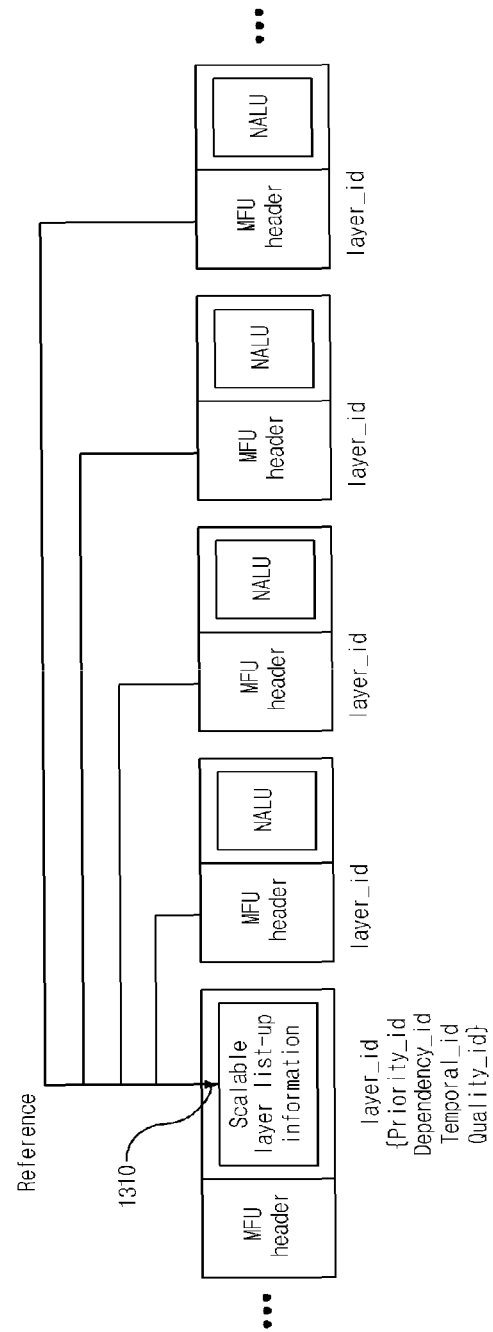
FIG. 13 illustrates a structure of layer information which configures a scalable video stream according to an exemplary embodiment of the present invention.

FIG. 13 illustrates a structure of layer information which configures a scalable UHD video stream according to an exemplary embodiment of the present invention. Hereinafter the structure of layer information which configures a scalable UHD video stream according to an exemplary embodiment of the present invention will be investigated in detail using FIG. 13.

It is preferred that scalable list-up information is being inserted once every predetermined period in a form of an MFU payload and transmitted. For example, when a base layer and an enhancement layer, which are contained in the scalable UHD video stream, are divided into MMT asset units and being transmitted via the different transmission channel, it may be transmitted with one scalable list-up information per one MMT asset. Of course, in addition to this, it may be transmitted after being inserted into the MFU payload if necessary.

The layer identifier value explained in FIG. 12 is included in scalable layer list-up information 1310, and includes a priority identifier value 1110 and layer information 1120 on each layer.

The layer identifier value is inserted into the MFU header, and is utilized as information necessary for recognizing layer information in MFU header. In other words, the priority identifier value 1110 and layer information 1120, that are being directed by the corresponding layer identifier value, can be determined from the layer identifier values marked in the MFU header by referring to same layer identifier value which is contained in scalable layer list-up information 1310.

Such scalable layer list-up information 1310 is being inserted once every predetermined period in a form of an MFU payload and transmitted.

FIG. 14 illustrates syntax of scalable list-up information for presenting the layer identifier values representing layer information which is contained in the scalable UHD video stream as base layer identifiers and extended layer identifiers both having fixed bit lengths.

Scalable layer list-up information 1400 is provided for representing the layer identifier value 1420, which represents layer information on each layer; it may reduce layer information that are being overlapped between the layers.

The layer identifier value 1420 is assigned from information on the total number of layers 1410 which is contained in the scalable UHD video stream, and one layer identifier value 1420 includes layer information on a priority identifier value 1430 and a resolution level 1440 for each layer, a time level 1440, and a picture quality level 1460.

FIG. 15 is the syntax of an MFU header designed for referring layer information of scalable layer list-up information with a base and an extended layer identifiers both having fixed bit lengths.

If the layer identifier present flag 1510 is '1,' layer information containing the layer identifier value 1420 may be referred from scalable layer list-up information 1400. At this moment, the layer identifier value 1420 is allocated by fixed 5-bit or 10-bit in the MFU header according to the total number of layers 1410 which is contained in the scalable UHD video stream of scalable layer list-up information 1400. In other words, when the total number of the scalable layers 1410 includes from 0 to 31 layers, the layer identifier extension flag 1520 has a value of '0,' and the layer identifier value 1540 is represented by a fixed 5-bit. When the total number of the scalable layers 1410 includes more than 32 layers, the layer identifier extension flag 1520 has a value of '1,' and the layer identifier value 1530 is represented by a fixed 10-bit.

Thus, since a flexible bit assignment according to the total number of the scalable layers 1410 becomes possible, the problem of unnecessary bit consumption for the layer identifier values can be solved.

FIG. 16 is the syntax of scalable list-up information for presenting the layer identifier values representing layer information which is contained in the scalable UHD video stream as a layer identifier having a variable bit length.

Although it is similar to scalable layer list-up information 1400 in FIG. 14, the difference is the flexible bit assignment by a variable bit, not by a fixed bit, for the layer identifier value 1630. In other words, it includes an actual bit calculation method 1620 for the necessary layer identifier value 1630 from the total number of the layers 1610 which is contained in the scalable UHD video stream. The bit calculation method 1620 is a method for calculating actual necessary bits by taking base 2 logarithm of the total number of the layers 1610, and rounding up the result to a whole number. Thus, this method shows a more flexible feature in bit assignment for the layer identifier value 1630 than the method in FIG. 14.

FIG. 17 is the syntax of an MFU header designed for referring layer identifier having a variable bit length.

The layer identifier value 1630 of scalable layer list-up information 1600 in FIG. 16 is inserted into an MFU header, which is the smallest unit of an MMT packet, thus, layer information can be transmitted.

The layer identifier value 1740 which is inserted into the MFU header can be utilized according to the layer identifier present flag (layer_id_present_flag) 1730 when the layer information flag 1710 of the MFU header is '1,' and layer type information 1720 represents a scalable video stream.

The layer identifier present flag 1730 has a value of '1' if a layer identifier value 1630 is present in scalable layer list-up information 1600, thus, layer information 1740 is provided inside of the MFU header by referring to the layer identifier value 1630.

If it is not present, it has a value of '0,' thus layer information 1740 inside of the MFU header according to the layer identifier value 1630 is not present. Thus layer information is provided from the priority value 1750, the resolution level 1760, the time level 1770, and the picture quality level 1780.

FIG. 18 is the syntax of scalable list-up information for presenting the layer identifier values representing layer information, which is contained in the scalable UHD video stream, as a layer identifier having a variable bit length, and also for allocating layer information, which is contained in the layer identifier, by bits having a variable length.

The scalable layer list-up information 1800 is provided for representing in a layer identifier value 1824 which represents layer information of each layers; it can reduce overlapping information between each layers; and unnecessary bit consumption problem can be solved by allocating variable bits to actual layer level.

The necessary bits 1812 for the layer identifier 1824 are calculated from the total number of the layers 1802 which is contained in the scalable UHD video stream, the actual necessary bits are calculated from the lengths of the range of the priority identifier value 1804, the resolution level 1806, the time level 1808, and the picture quality level 1810 among entire layer information.

A method for calculating actual necessary bits (steps from 1812 to 1820) calculates number of bits by taking base 2 logarithm of each length and rounding up the result to a whole number.

In order to assign layer identifier value 1824 representing layer information on each layer, iteration 1822 is performed up to the total number of the layers which is contained in the scalable UHD video stream.

Thus, the layer identifier value 1824 representing each layer is present, and a layer identifier value 1824 includes a priority identifier value 1826, a resolution level 1828, a time level 1830, and a picture quality level 1832. At this moment, only actual necessary bits are variably allocated to individual information.

In describing information on each layer through scalable layer list-up information 1800 including such information, the problem of unnecessary bit consumption can be solved by considering overlapped information and calculating actual necessary bits.

A method according to an exemplary embodiment of the present invention can be implemented in a form of program instructions which can be performed through various computing means, and can be recorded on a computer readable media. Said computer readable media may include a program instruction, a data file, a data structure, and the like, or any combinations thereof. Program instructions which are recorded in said media may be the ones specially designed and configured for the present invention, or the usable ones which has been publically known to a person skilled in the art in the field of computer software. Examples of the computer readable recording media include a hard disk, a magnetic media such as a floppy disk and a magnetic tape, a CD-ROM, an optical recording media such as a DVD, a magneto-optical media such as a floptical disk, and the hardware devices especially configured to store and perform program instructions such as a ROM, a RAM, a flash memory, and the like. Examples of the program instructions include not only machine language codes like the one generated by a compiler but also high level language codes which can be performed by a computer using an interpreter and the like. The above described hardware devices may be configured to operate as at least one software module in order to perform the operation of the present invention, and vice versa.

Although the present invention is described with reference to one embodiment as illustrated in the drawings, it is merely exemplary and it will be understood for the person of ordinary skill in the art that various variations and equivalent other exemplary embodiments are possible from the foregoing disclosure.

What is claimed is:

1. A method for transmitting program configuration information by a multimedia content transmitter, the method comprising:

creating a base layer packet and an enhancement layer packet, which include at least one base layer and at least one enhancement layer respectively, based on MPEG-2 transport stream (TS) or MPEG media transport (MMT), from a scalable ultra-high definition (UHD) video coding bit stream;

creating a program map table (PMT), the PMT being configuration information on both of the base layer packet and the enhancement layer packet;

multiplexing the base layer packet and the PMT together to generate a multiplexed base layer packet including the PMT and the at least one base layer; and transmitting the multiplexed base layer packet including the PMT to a receiving end via a broadcasting network prior to transmitting the enhancement layer packet to the receiving end via an internet protocol (IP) network so that the receiving end identifies the PMT in advance, wherein a table identifier is assigned to the PMT to indicate that an extended PMT syntax is added to the PMT while an existing PMT syntax is maintained and to indicate the PMT is an extended PMT which has been converted from an existing PMT.

2. The method according to claim 1, wherein the PMT comprises a number of created packets, transmission paths of the packets, encoding information of the packets, and a number of a plurality of groups to which the created packets belong, wherein the transmission paths of the packets include the broadcasting network corresponding to the multiplexed base layer packet and the IP network corresponding to the enhancement layer packet, and wherein the plurality of groups are transmitted to the receiving end via different physical paths among the transmission paths of the packets.

3. The method according to claim 2, wherein the table identifier indicates transmitting of the scalable UHD video coding bit stream via two channels including the broadcasting network and the IP network.

4. A method for receiving program configuration information by a subscriber terminal, the method comprising:

receiving, via a broadcast network, a multiplexed base layer packet including a base layer created from a scalable ultra-high definition (UHD) video coding bit stream prior to receiving at least one enhancement layer so as to identify a program map table (PMT) in advance, the multiplexed base layer packet being generated when the base layer is multiplexed with the PMT to include the PMT and the base layer in the multiplexed base layer packet;

extracting, from the received multiplexed base layer packet, the PMT indicating configuration information on the base layer packet and the at least one enhancement layer;

receiving the at least one enhancement layer via an internet protocol (IP) network;

acquiring a number of packets and information about transmission paths of the packets created from the extracted the PMT; and decoding the base layer and the at least one enhancement layer based on the acquired number of packets and the information about the transmission paths wherein a table identifier is assigned to the PMT to indicate that an extended PMT syntax is added to the PMT while an existing PMT syntax is maintained and to indicate the PMT is an extended PMT which has been converted from an existing PMT.

5. The method according to claim 4, wherein the base layer packet is being received via a broadcasting network, and a part or all of the enhancement layer is being received via an IP network.

6. The method according to claim 5, wherein the table identifier indicates transmitting of the scalable UHD video coding bit stream via two channels including the broadcasting network and the IP network.

7. A method for transmitting scalable layer information by a multimedia content transmitter, the method comprising:

creating a scalable video stream, which includes a plurality of layers including a base layer and at least one enhancement layer, based on MPEG media transport (MMT), each of the plurality of layers including a plurality of picture frames; and creating a first MMT packet including the base layer as a first MMT payload, and creating a second MMT packet including the at least one enhancement layer as a second MMT payload;

creating scalable layer list-up information which manages layer information which configures the scalable video stream;

inserting the scalable layer list-up information in at least one of the first MMT payload and the second MMT payload; and transmitting the first MMT packet to a receiving end via a first transmission channel, and transmitting the second MMT packet to the receiving end via a second transmission channel different from the first transmission channel, wherein the scalable layer list-up information includes the layer information on each layer of the scalable video stream and a layer identifier representing the layer information, and wherein the layer identifier is mapped to a combination of a priority identifier value indicating a priority assigned to each of a plurality of frames included in the scalable video stream, a dependency level assigned to each of the plurality of layers, a time level hierarchically indicating a temporal scalability, and a picture quality level assigned to each of the plurality of picture frames.

8. The method according to claim 7, wherein the layer identifier is inserted into a media fragment unit (MFU) header of at least one of the first MMT packet and the second MMT packet.

9. The method according to claim 8, wherein the scalable video stream is divided and included in the at least one of the first MMT payload and the second MMT payload.

10. The method according to claim 9, wherein:
the scalable layer list-up information represents layer information on each layer which configures the scalable video stream as one layer identifier;
the layer identifier describes overlapping layer information no more than once; and
the layer identifier and layer information on each layer including the layer identifier are being allocated by fixed bit.

11. The method according to claim 9, wherein:
the scalable layer list-up information represents layer information on each layer which configures the scalable video stream as one layer identifier;
the layer identifier describes overlapping layer information no more than once;
the layer identifier calculates actual necessary bits according to a total number of scalable layers, and allocates by variable bit; and
the layer information on each layer including the layer identifier is being allocated by fixed bit.

12. The method according to claim 9, wherein:
the scalable layer list-up information represents layer information on each layer which configures the scalable video stream as one layer identifier;
the layer identifier describes overlapping layer information no more than once;
the layer identifier calculates actual necessary bits according to a total number of the scalable layers, and allocates by variable bit; and
the layer information on each layer including the layer identifier is being allocated by variable bit adapting to actual layer level.

13. An apparatus for creating a header of a media fragment unit (MFU) of an MPEG media transport (MMT) packet, the apparatus comprising:
at least one processor;
a computer-readable storage medium storing instructions which, when executed by the at least one processor, cause the at least one processor to perform operations comprising:
creating a scalable video stream, which includes a plurality of layers including a base layer and at least one enhancement layer, based on MMT, each of the plurality of layers including a plurality of picture frames; and
creating a first MMT packet including the base layer as a first MMT payload, and creating a second MMT packet including the at least one enhancement layer as a second MMT payload;
creating scalable layer list-up information which manages layer information which configures the scalable video stream;
inserting the scalable layer list-up information in at least one of the first MMT payload and the second MMT payload; and
transmitting the first MMT packet to a receiving end via a first transmission channel, and transmitting the second MMT packet to the receiving end via a second transmission channel different from the first transmission channel,
wherein the scalable layer list-up information comprises layer identifiers are being selectively referred to through the header of the MFU;
wherein each layer identifier of the layer identifiers is one of a base layer identifier having a fixed number of bits and an extended layer identifier; and
wherein the each layer identifier of the layer identifiers is mapped to a combination of a priority identifier value indicating a priority assigned to each of a plurality of frames included in the scalable video stream, a dependency level assigned to the each of the plurality of layers, a time level hierarchically indicating a temporal scalability, and a picture quality level assigned to the each of the plurality of frames.

14. The apparatus according to claim 13, wherein the scalable video stream is divided and included in the MMT payload.

15. The method according to claim 1, wherein the PMT contains transmission channel type information indicating whether each packet is transmitted via the broadcasting network or the internet protocol (IP) network.

* * * * *